(12) United States Patent
Shen et al.

(10) Patent No.: US 12,073,160 B1
(45) Date of Patent: Aug. 27, 2024

(54) DYNAMIC VOLTAGE DROP MODEL FOR TIMING ANALYSIS

(71) Applicant: ANSYS, INC., Canonsburg, PA (US)

(72) Inventors: Qian Shen, Southborough, MA (US); Sankar Ramachandran, Bangalore (IN); Joao Geada, Chelmsford, MA (US); Scott Johnson, Pflugerville, TX (US); Anusha Gummana, Bengaluru (IN)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 18/208,224

(22) Filed: Jun. 9, 2023

Related U.S. Application Data

(63) Continuation of application No. 17/315,838, filed on May 10, 2021, now Pat. No. 11,709,983.

(51) Int. Cl.
*G06F 30/3312* (2020.01)
*G06F 30/398* (2020.01)

(52) U.S. Cl.
CPC ........ *G06F 30/3312* (2020.01); *G06F 30/398* (2020.01)

(58) Field of Classification Search
USPC ......................................................... 716/113
See application file for complete search history.

(56) References Cited

U.S. PATENT DOCUMENTS

| | | | |
|---|---|---|---|
| 6,951,001 B2 | 9/2005 | Chen | |
| 6,988,255 B2 | 1/2006 | Allen | |
| 7,073,140 B1 | 7/2006 | Li | |
| 9,189,584 B2* | 11/2015 | Feldmann | G06F 30/39 |
| 10,990,731 B1 | 4/2021 | Odabasi et al. | |
| 11,531,794 B1* | 12/2022 | Odabasi | G06F 30/18 |
| 11,709,983 B1* | 7/2023 | Shen | G06F 30/3312 |
| | | | 716/113 |
| 2002/0065643 A1* | 5/2002 | Hirano | G06F 30/367 |
| | | | 703/19 |
| 2004/0098684 A1 | 5/2004 | Amekawa | |
| 2006/0277512 A1* | 12/2006 | Kucukcakar | G06F 30/39 |
| | | | 716/112 |
| 2010/0281442 A1* | 11/2010 | Dickinson | G01R 31/31835 |
| | | | 716/136 |

\* cited by examiner

*Primary Examiner* — Mohammed Alam
(74) *Attorney, Agent, or Firm* — Womble Bond Dickinson (US) LLP

(57) ABSTRACT

Analysis of power supply noise in simulations of a design of a circuit can use per instance dynamic voltage drops (DVD) in timing analyses so that the simulated DVD values on a per victim cell basis can accurately guide the timing analysis on each victim instead of a global DVD for all victims during the timing analysis. In one embodiment, a method can: determine, during a power analysis simulation, a representation of an energy lost, during each switching window at each output of each victim cell, at one or more power supply rails of each of the victim cells in the set of victim cells due to aggressors in the design; and provide the representation of the energy lost separately for each victim cell to a timing analysis system. The representation can be a rectangle having a width defined by a switching window of a victim's output.

20 Claims, 6 Drawing Sheets

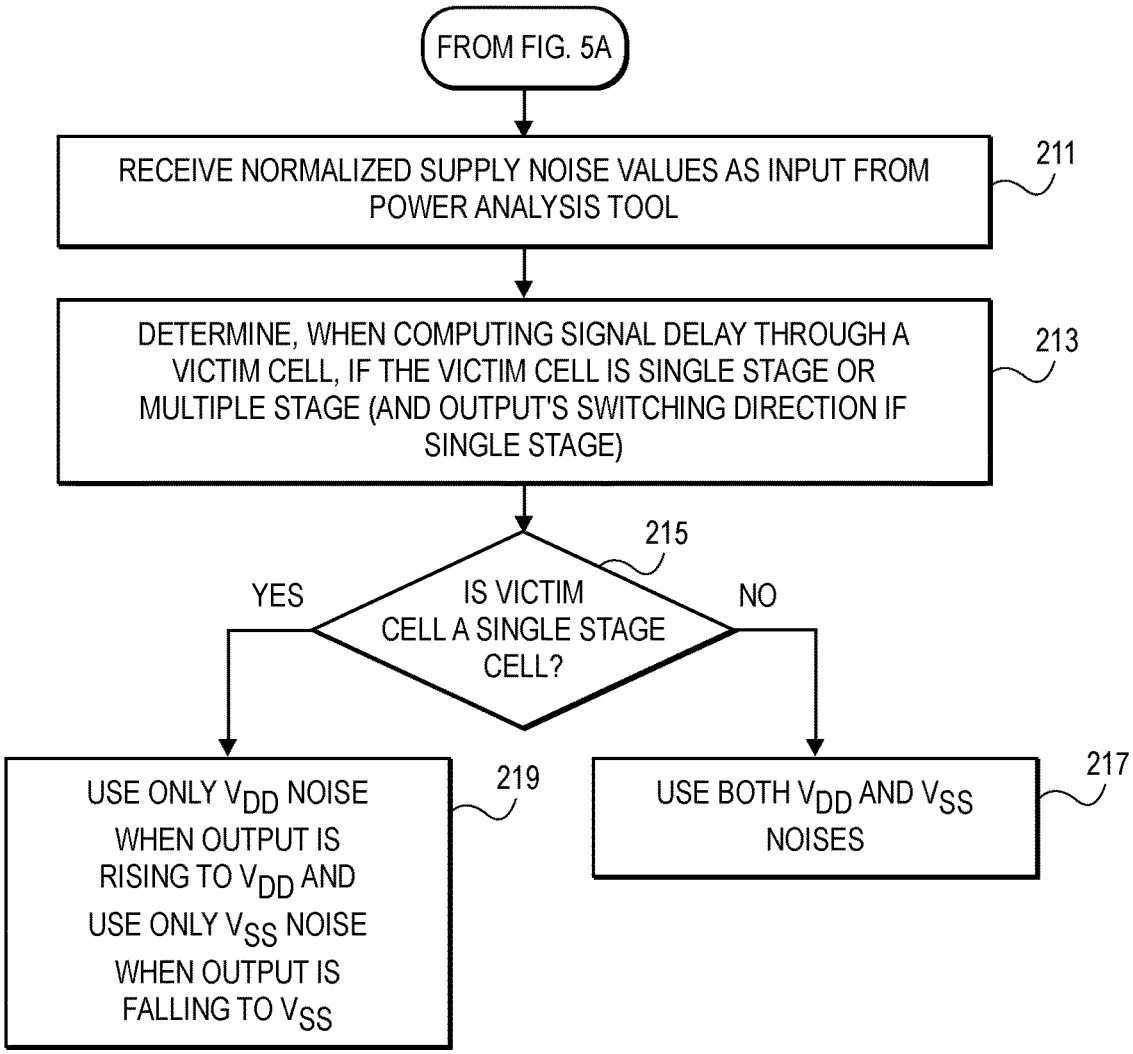
FIG. 5B
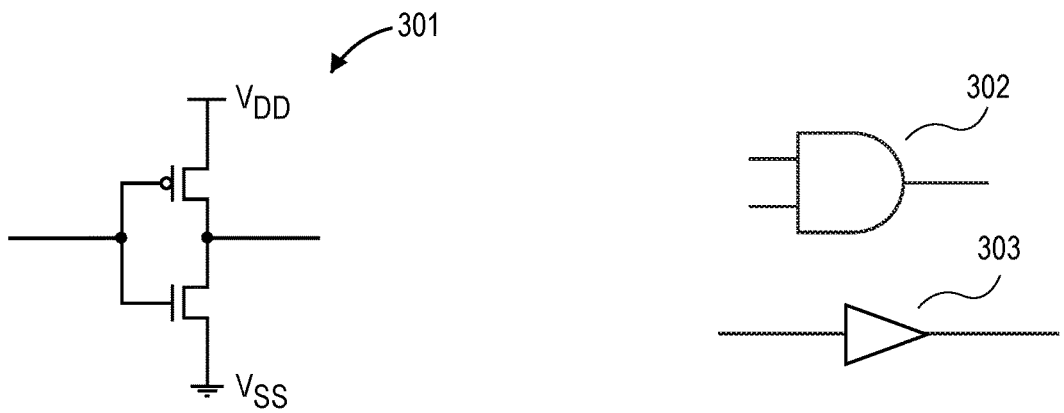
FIG. 6A          FIG. 6B

DYNAMIC VOLTAGE DROP MODEL FOR TIMING ANALYSIS

CROSS-REFERENCE TO RELATED APPLICATION

This is a continuation application of U.S. application Ser. No. 17/315,838, filed on May 10, 2021, entitled "DYNAMIC VOLTAGE DROP MODEL FOR TIMING ANALYSIS", which is incorporated by reference in its entirety.

BACKGROUND

The field of this disclosure relates to methods and systems for designing circuits, such as integrated circuits (ICs). For example, the disclosure relates to computer aided design and computer aided engineering which can use simulations, such as dynamic voltage drop simulations, of a design of a circuit to test how well the design will work.

Dynamic voltage drop analysis is often done to simulate how a power grid or power distribution network in an integrated circuit will perform when data signals switch or toggle between voltage states, such as from high to low states, etc. Often, this switching can cause circuits to consume more power than when the circuit is idle (and therefore there is little switching). This increased power consumption can cause the power grid to deliver less than desired levels of voltage at one or more nodes or pins in the circuit, and this lowered level of voltage can affect the operation of logic circuits to the extent that the logic circuits may not operate correctly or as desired. Thus, circuit designers often use simulation software to perform dynamic voltage drop analysis before they finish the design of an electrical circuit. Dynamic voltage drop (DVD) analysis typically involves simulating the repeated change over time of various data signals so that over time different data signals are repeatedly toggled to different voltage states to simulate normal operation of the circuit (in which it is expected that the various data signals will change over time due to the normal operation of the circuit). Switching by aggressor cells can produce voltage drops at power supply rails of a victim cell, and this can cause the delay of signals from the output of the victim cell because of the voltage drops. This delay shifts the signals in time which can delay signals downstream from the victim cell. In effect, the switching by the aggressor cells create power supply noise at the victim which in turn delays an output from the victim cell. Traditional timing analysis tools attempt to model this noise (if they perform a modeling of noise) by using a global (for all victims) constant voltage drop in the timing analysis. This type of one-size fits all model in the timing analysis leads to both false positives and misses of real failures at the same time. However, it is not at all clear how to change this one-size fits all model to deal with several challenges in how to produce an accurate timing analysis based on the results from a DVD analysis.

SUMMARY OF THE DESCRIPTION

The embodiments described herein can produce estimations of power supply noise, as result of dynamic voltage drops caused by one or more aggressors, on a per victim cell basis, and these estimations can be used to determine signal delays separately at the outputs of each of the victim cells. The estimations of power supply noise can be expressed as a representation of energy lost at each of the victim cells.

A method according to one embodiment can include the following operations: determining a switching window at each output of each victim cell in a set of victim cells during a power analysis simulation of a design of a circuit containing the set of victim cells; determining, during the power analysis simulation, a representation of an energy lost, during each switching window, at one or more power supply rails of each of the victim cells in the set of victim cells due to aggressors in the design; and providing the representation of the energy lost separately for each victim cell to a timing analysis system. The timing analysis system can compute, in one embodiment, a timing analysis at the output of each of the victim cells based on the representation of the energy lost for each victim cell. In one embodiment, the representation of the energy lost for each victim cell is a geometric shape that represents an area associated with a simulated voltage curve (and an ideal supply voltage from a supply voltage rail) for each victim cell, and wherein the timing analysis is performed on a per victim cell basis such that each victim cell has a separate timing analysis based on the energy lost for that victim cell. In one embodiment, the geometric shape for each victim cell can be a rectangle having a width defined by a beginning and an ending of the switching window for each victim cell and a height computed from the area for that victim cell divided by the width for that victim cell. In one embodiment, a timing window is a static timing analysis terminology that refers to a window of time in which it is possible for a digital signal (usually on a pin in a cell in an IC design) to switch (in logical value); the term "window" refers to a set of two time values: as start time and an end time. Each switching direction (rise/fall) would normally have its their own timing window (or more often windows). In one embodiment, it is possible for a signal at an output pin to switch (in a specific direction) only within its timing window. The output pin's actual switching window is determined by a power analysis tool based on a specific switching event (e.g., defined by switching vectors), and the switching window is contained within the timing window of the output pin (so the switching window for a victim is contained within the victim's timing window and is a subset of the victim's timing window).

In one embodiment, a power analysis tool performs the determining of the representation (e.g., a rectangle for a particular victim cell) and provides the representation of the energy lost separately for each victim cell to the timing analysis system. In one embodiment, the area for each victim cell is computed from the sum of areas contributed by each aggressor for a particular victim cell. In one embodiment, a center of the switching window is aligned to a center of the transition slew of the particular victim cell.

In one embodiment, the area, for each victim cell, is the area between an ideal voltage supply rail (e.g., $V_{DD}$ or $V_{SS}$) and a simulated voltage supply after accounting, through the power analysis simulation, for voltage drops at one or more voltage supply rails due to switching of aggressors in a vicinity of the corresponding victim cell, and wherein the area, for each victim, is computed by an integration of the space between a curve of the simulated voltage supply and the ideal voltage supply rail. In one embodiment, a height and a width of the area for each victim cell is provided to the timing analysis system prior to computing the timing analysis. In one embodiment, the timing analysis system computes the timing analysis for a first set of victim cells using only one voltage supply rail (e.g., $V_{DD}$ or $V_{SS}$) and computes the timing analysis for a second set of victim cells using two voltage supply rails (e.g., $V_{DD}$ and $V_{SS}$). In one embodiment, for the first set of victim cells (e.g., single stage cells), only a first voltage supply rail is used when an output transition of a victim cell in the first set is falling and only a second voltage supply rail is used when an output transition of the victim cell in the first set is rising, the second voltage supply rail being at a higher voltage than the first voltage supply rail; each victim cell in the first set of victim cells is a single stage cell, and each victim cell in the second set of victim cells is a multiple stage cell. In one embodiment, the switching window at the output of a victim cell occurs when the output of the victim cell transitions between voltage states (e.g., a rising transition from ground to $V_{DD}$ or a falling transition from $V_{DD}$ to ground).

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a simulation system. The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 5B is a flowchart that shows a method for using the representation of energy lost from FIG. 5A to compute timing delays as a result of the voltage drops.

FIG. 6A shows an example of a single stage cell, such as a single stage victim cell.

FIG. 6B shows examples of a multiple stage cell, such as a multiple stage victim cell.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
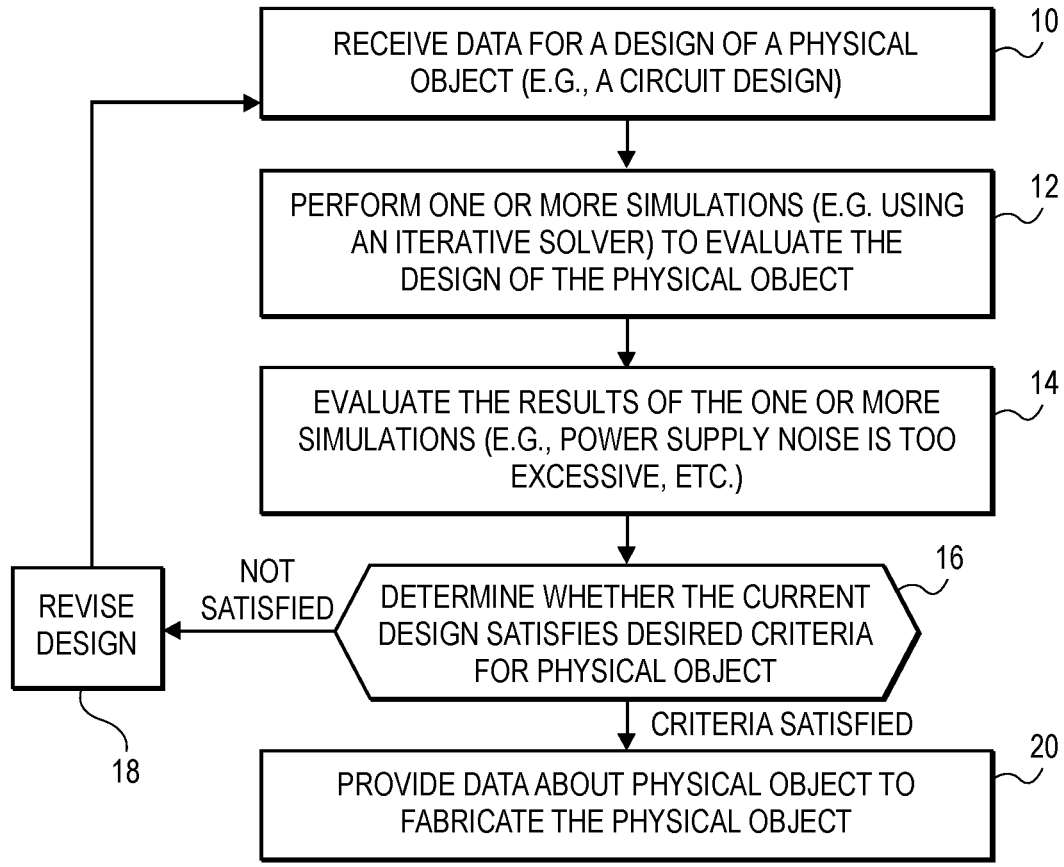
FIG. 1 is a flowchart which illustrates a method which can be used according to one or more embodiments described herein to design an integrated circuit (IC) and simulate the properties (e.g., signal delays due to power supply noise) of the system prior to fabricating the IC.

The embodiments described herein can be used in simulations of electrical circuits (for example, an IC) in order to determine whether a particular design of the IC satisfies particular requirements for the circuit or system containing the circuit. For example, there might be certain design requirements relating to a power distribution network or other portions in the IC. FIG. 1 shows a method in which these design requirements can be tested relative to a particular design of an IC which is being simulated. In operation 10 of FIG. 1, a data processing system (e.g., a computer executing simulation software to provide a simulation system) can receive data about a design for a particular IC package or other electrical circuit. The data can be created in CAD software on a data processing system, and the data can include cell library information, other timing information and information about the geometry of the IC, pins and nets in the IC and information about the materials in the conductors and dielectrics (e.g., silicon dioxide, etc.) Then in operation 12, the data processing system can perform one or more simulations (such as simulations based on physical models of the IC package and PCB) to evaluate the design of the IC by determining, for example, dynamic voltage drop values in the IC. These simulations can use the aspects and embodiments described herein. In operation 14, the designer can evaluate the results of one or more simulations to determine whether the design of the IC satisfies certain desired criteria for the design. This determination is shown in operation 16. If the one or more criteria is satisfied, then the designer in operation 20 can provide data about the circuit to allow the fabrication or manufacture of the IC or system. For example, if the one or more criteria are satisfied, a CAD file can be produced that describes how to build the IC or system. If the criteria are not satisfied as determined in operation 16, the designer can revise the design in operation 18 (for example, by changing sizes and/or quantity of the power distribution network in the IC or moving conductors in the design, etc.) and repeat the process by performing additional further simulations to evaluate the redesigned circuit. This can be repeated until the desired criteria are achieved for the circuit.

Figure 2:
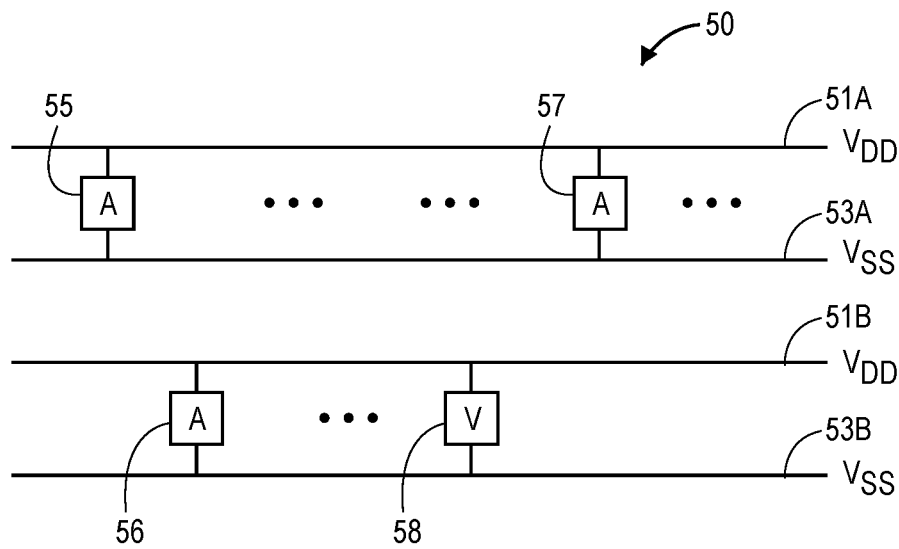
FIG. 2 shows an example of a circuit design that includes many cells (e.g., cells each containing one or more logic gates) that receive power through a power grid of voltage supply rails (e.g., $V_{DD}$ and $V_{SS}$).

The embodiments in this disclosure can be employed to simulate an IC that includes a power distribution network or grid of conductors that distribute power through the IC to various cells (e.g., logic cells such as buffers, inverters, clocked registers, AND gates, OR gates, NAND gates, XOR gates etc.). FIG. 2 shows an example of such an IC; FIG. 2 shows portion 50 of the IC. This portion includes many cells, such as cells 55, 56, 57, and 58 (with many more cells not shown to reduce the complexity of the figure). Each of the cells is powered by at least two voltage rails; one voltage rail can supply a positive voltage (e.g. $V_{DD}$) and another voltage rail can supply another voltage, such as ground (e.g., $V_{SS}$). For example, power supply voltage rails 51A and 53A provide power to a set of cells coupled between those rails, including cells 55 and 57. Power supply voltage rails 51B and 53B provide power to a set of cells coupled between those rails, including cells 56 and 58. In this example in FIG. 2, a cell 58 has been selected as a victim cell for analysis of voltage drops caused by aggressors, such as cells 55, 56, and 57.

It will be understood that in normal operation, many different victim cells can be selected for this analysis in the embodiments described herein, and each of these victim cells can be analyzed separately using the embodiments described herein to determine their energy lost and their signal delays at their outputs. Moreover, the timing analysis for each victim cell can be tailored to their specific energy loss (e.g., their specific rectangular representations of energy lost as described below) rather than using a global voltage drop or energy loss for all victims. Also, the embodiments described herein can limit the aggressors to a small set of aggressors for each victim (e.g., a set of local aggressors that have the most impact on voltage drops). For example, the methods and systems described in U.S. Pat. No. 10,990,731 (issued Apr. 27, 2021 from U.S. application Ser. No. 16/723,870 which was filed Dec. 20, 2019) can be used to select a limited set of aggressors for each victim cell, and this will often be limited to aggressors in the vicinity of the victim cell; this U.S. Pat. No. 10,990,731 is hereby incorporated herein by reference. Moreover, the embodiments described herein can limit the aggressors for a particular victim cell to those aggressors that switch during the same time that the victim cell switches; this is also described in U.S. Pat. No. 10,990,731. For example, if certain aggressors in a region containing a victim do not switch at the same time as the victim, then those aggressors can be ignored in one embodiment when performing the dynamic voltage drop simulations for the victim. In other words, in one embodiment the simulation of the dynamic voltage drop of the particular victim is performed using aggressors that switch at the same time or nearly the same time as the victim and the simulations ignore the effect of local aggressors within the region of the victim that do not switch at the same time (or nearly the same time) as the victim. This will be described further below. In the example shown in FIG. 2, cells 55, 56, and 57 are aggressor cells that cause a voltage drop at one or more supply rails (e.g., rails 51B and/or 53B) of the victim cell 58 when the output of victim cell 58 switches, and these aggressor cells switch at the same time or nearly the same time as victim cell 58.

Figure 3:
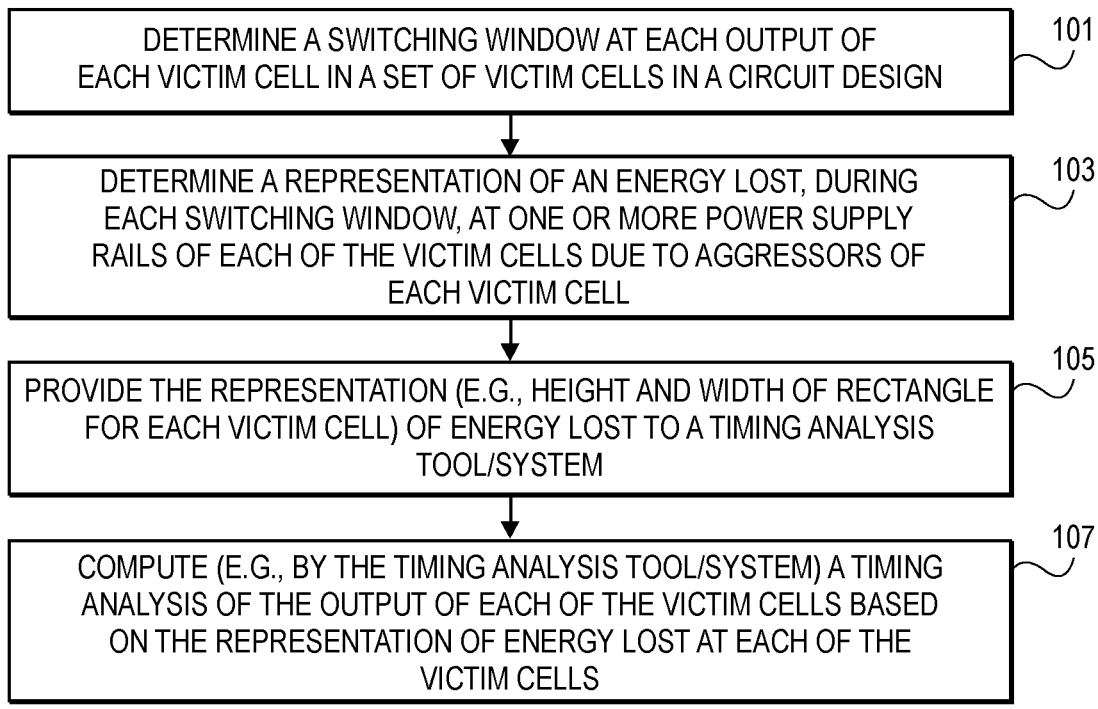
FIG. 3 is a flowchart that shows an example of a method according to one embodiment.
Figure 4:
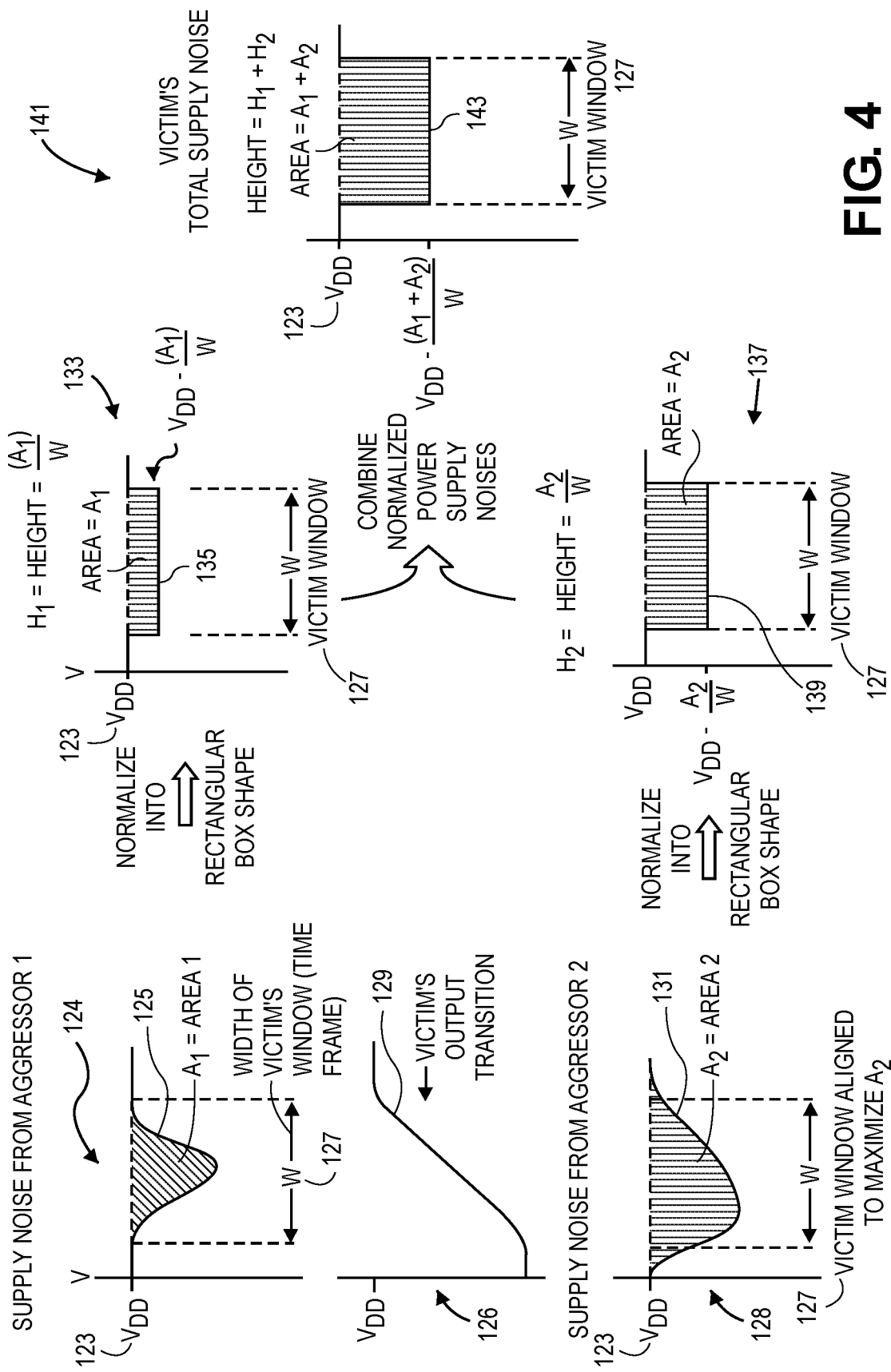
FIG. 4 illustrates how a set of areas of lost energy (caused by a set of aggressors) at power supply rails of a victim cell can be normalized and combined according to one embodiment to provide a representation of voltage drop (at the victim cell) for use in a timing analysis that can indicate how output signals from the victim cell may be delayed as a result of the voltage drops.

FIG. 3 shows a general example of a method according to one embodiment. This method begins after a simulation system (e.g., a data processing system executing simulation software) receives information (described further below) about a design of a circuit. This information allows the simulation system to determine a switching window at an output of each victim cell and also allows the simulation system to determine a set of aggressor cells for each victim cell in a design. In one embodiment, the set of aggressors for each victim cell can be a limited set of aggressors (as described in U.S. Pat. No. 10,990,731). In operation 101 in FIG. 3, the simulation system can determine a switching window at each output of each victim cell in a set of victim cells in the design. This switching window is the period of time in which there was a transition slew from one voltage state (e.g., $V_{DD}$) to another voltage state (e.g., $V_{SS}$) at the output of the victim cell as a result, during simulation of the operation of the circuit, of a change in the input to the victim cell. Voltage plot 126 in FIG. 4 shows an example of a rising transition, during the victim's switching window, of a victim's output, shown as the output transition 129. The switching window can be based on a simulated output transition that can be based on data, such as cell library characterization data, about the victim cell; the switching window can be defined by the edges of the slew and may capture all or most (e.g., 90%) of the transition slew. The switching window for a cell can be determined by a power analysis tool during a dynamic voltage drop simulation of a circuit containing the cell and other cells that draw power as a result of simulated switching events.

In operation 103 in FIG. 3, the system determines a representation of an energy lost (or voltage lost over time), during each switching window, at one or more power supply rails of each of the victim cells; this energy lost is the result of voltage drops at one or more power supply rails of the victim cell caused by the set of aggressors for the particular victim cell. The drop of voltage over time at one or more power supply rails can be considered an equivalent to energy lost at the victim cell even though it is not strictly an "energy" value. Then in operation 105, the system provides the representation of energy lost to a timing analysis tool or system which can use the representation to compute how the output signal at the output of the victim cell may be delayed as a result of the energy lost. In one embodiment, the representation can take the form of a rectangle having a width defined by the switching window at the output of each victim cell and a height computed by dividing the area (between the ideal voltage supply and the computed/simulated power supply values (i.e., voltage drop) caused by the aggressors of the victim cell) by the width. This can be seen in FIG. 4 and will be described further below. Then in operation 107, the timing analysis tool or system (e.g., a timing analysis tool in a simulation system) can compute a timing analysis of the output signal from each victim cell based on the representation of energy lost at each of the victim cells. The timing analysis can be based on conventional and known methods for computing the timing analysis of these output signals, except that the analysis is based on the representation of energy lost, such as the rectangle for each victim cell. This timing analysis can provide a more accurate simulated estimate of signal delays at the output of the victim cells because the representation of energy lost is specific to the victim cell and is an accurate but simple way to indicate the voltage lost at the victim cell.

FIG. 4 shows an example of an embodiment that uses rectangles to represent the energy lost at each victim cell due to aggressor cells that switch at the same time (or nearly the same time) as the victim cell. While the example shown in FIG. 4 shows one victim cell, it will be understood that the example in FIG. 4 can be used on all victim cells in the design (which may be a select group of cells or all cells in the design). While the example shown in FIG. 4 uses only two aggressor cells, it will be appreciated that each victim cell may have many aggressor cells. In the example shown in FIG. 4, it is assumed that the system has determined the switching window for the victim cell, and this determined switching window is shown as width 127 which coincides with the transition slew of the victim's output transition 129 shown in voltage plot 126 below the voltage plot 124. It is also assumed that the system has determined that, based on the switching window (width 127 which represents a period of time) that there are 2 aggressor cells that switch at the same time as the victim cell and cause voltage drops on a power supply rail of the victim cell (in other words, the switching windows of the two aggressors overlap in time with the switching window of the victim). Voltage plot 124 shows the power supply noise caused by the first aggressor cell, and voltage plot 128 shows the power supply noise caused by the second aggressor cell. This power supply noise is the result of the voltage drops on the $V_{DD}$ voltage supply rail of the victim cell which has a rising transition as shown in the voltage plot 126. Each of the voltage plots in FIG. 4 shows voltage on the Y axis and time on the X axis. In the case of the first aggressor, it causes a voltage drop curve 125 relative to the ideal power supply voltage 123 ($V_{DD}$ in this example). The voltage drop curve 125 can be computed by the simulation system based on information about the first aggressor cell and the victim cell using techniques known in the art. The area $A_1$ between the ideal power supply voltage 123 and the curve 125 can be computed by the simulation system using techniques known in the art (e.g., an integration the computes the area). In the case of the second aggressor, it causes a voltage drop curve 131 relative to the ideal power supply voltage 123 ($V_{DD}$ in this example). The voltage drop curve 131 can be computed by the simulation system based on information about the second aggressor cell and the victim cell using techniques known in the art. The area $A_2$ between the ideal power supply voltage 123 and the curve 131 can be computed by the simulation system using techniques known in the art (e.g., an integration the computes the area).

Once the simulation system has computed both areas, it can then normalize them based on the width 127 as shown in FIG. 4. In particular, the simulation system can in one embodiment normalize each of the original shapes (of the areas between the ideal power supply voltage 123 and the respective curve 125 and 131) into rectangular shapes, and these rectangles can represent the energy lost at the victim cell for each aggressor cell; this rectangular representation is both simple and accurate and allows one part of the simulation system (e.g., the power analysis tool) to pass to another part of the simulation system (e.g., the timing analysis tool) two simple parameters (width and height) for each rectangle. This accurately and simply conveys the necessary information to allow the timing analysis tool to compute signal delays at the output of the victim cell based on this representation.

The voltage plot 133 shows the rectangular representation 135 of area 1 caused by first aggressor; this rectangular representation has its center co-located with the center the width 127 and the width of the rectangle is the same as the width 127. The height of the rectangular representation 135 is computed by dividing the area $A_1$ by the width 127 (so $H_1=A_1/W$). The height represents the voltage drop from $V_{DD}$ in this example (so the victim cell has a normalized voltage drop of $V_{DD}-H_1$ as shown in FIG. 4). The voltage plot 137 shows the rectangular representation 139 of area 2 caused by the second aggressor; this rectangular representation has its center co-located with the center the width 127 and the width of the rectangle is the same as the width 127. The height of the rectangular representation 139 is computed by dividing the area $A_2$ by the width 127 (so $H_2=A_2/W$). The height represents the voltage drop from $V_{DD}$ in this example (so the victim cell has a normalized voltage drop of $V_{DD}-H_2$ as shown in FIG. 4). As shown in FIG. 4, the normalized representations (in the form of rectangular representations 135 and 139 are combined together by adding their heights to give the combined rectangular representation 143. This combined rectangular representation (with a voltage drop of $V_{DD}-(H_1+H_2)$) is then passed to the timing analysis tool to allow the timing analysis tool to compute signal delays for the output of the victim cell based on the voltage drop of the combined rectangular representation.

Several observations can be made about the approach shown in FIG. 4. This approach recognizes that a victim cell's delay is most sensitive during the victim cell's output switching window; outside of this switching window, the supply noise impact on signal delay is small and can be ignored. Thus, it is desirable to align the switching of aggressors to the victim's switching window by finding those aggressors that are switching during that time frame of the victim's switching window (and ignoring aggressors that are not switching during that time frame). In other words, the approach finds aggressors that have switching windows that overlap in time with the victim's switching window (and ignore aggressors that have switching windows that do not overlap with the victim's switching window). This approach can begin by comparing the timing window of the each of the aggressors and the timing window of the victim; each of the timing windows contain all possible actual switching windows for a cell, so if an aggressor's timing window does not overlap with the victim's timing window, there can be no overlap in time between this aggressor's switching window and the victim's switching window. This comparison of timing windows can narrow down the set of aggressors and can be used in the method in FIG. 5A. This approach in FIG. 4 also does not attempt to capture information about the particular shape of the original areas; area 1 and area 2 have different shapes (with area 1 being more Gaussian than area 2) but the approach does not attempt to distinguish between the shapes. Rather, the approach attempts to capture the areas and then normalize them to rectangular shapes. Another aspect of this approach, described further below, is the use of information about the direction of the victim's transition (rising or falling). As explained further below, the type of supply noise (e.g., $V_{DD}$ versus ground) a victim cell delay is sensitive to is based on the direction of the victim's transition; rising transitions are sensitive to noise on $V_{DD}$ (but not so sensitive to noise on the ground rail), and falling transitions are sensitive to noise on the ground rail (but not so sensitive to noise on the $V_{DD}$ rail). Another aspect of this approach, described further below is the use of information about the number of stages of the victim cell. For single stage victim cells, a system can use a normalized representation for only one supply rail (depending the direction of the victim's transition); in the case of FIG. 4, the victim can be a single stage cell (e.g., see the cell in FIG. 6A) and hence, with the rising transition of the victim in FIG. 4, the normalized representation is only for the $V_{DD}$ power supply rail (and the system ignores the supply noise on the ground rail in this case). In the case of multiple stage cells (e.g., see the cells in FIG. 6B), normalized representations are used for both supply rails.

Figure 5A:
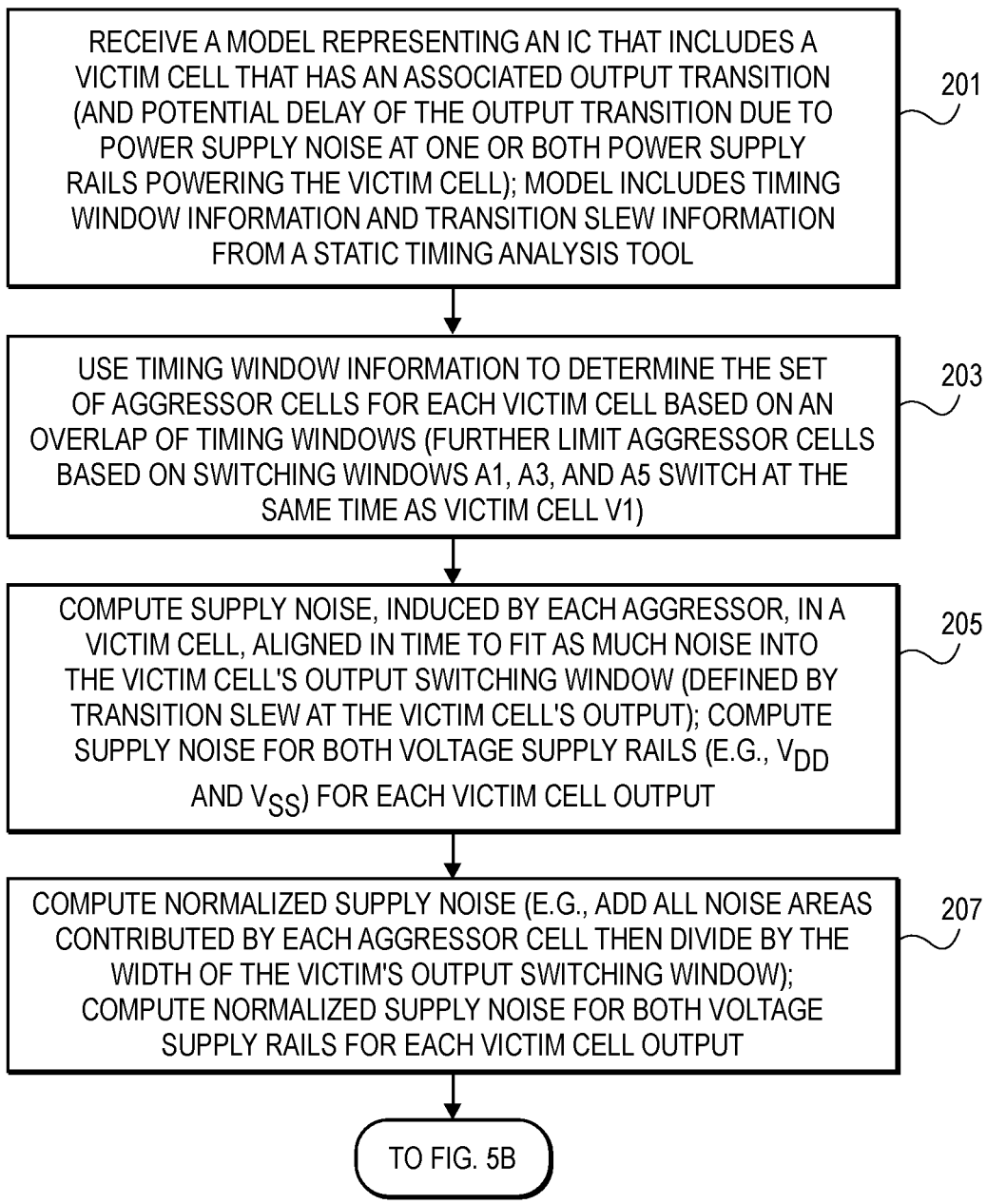
FIG. 5A is a flowchart that shows a method for computing a representation of energy lost.

The methods shown in FIGS. 5A and 5B provide another example of an embodiment that operates in a simulation system that includes a power analysis tool and a timing analysis tool that work together and exchange information to allow the power analysis tool to perform DVD simulations that can inform the timing analysis tool about voltage drops that may delay the output of signals from victim cells. The information about these voltage drops can include the rectangular representations described above, such as a combined rectangular representation (e.g., the combined rectangular representation 143) for each victim cell, and this information is provided by the power analysis tool to the timing analysis tool in the methods shown in FIGS. 5A and 5B. In one embodiment, the power analysis tool performs the operations shown in FIG. 5A and the timing analysis tool performs the operations shown in FIG. 5B.

Referring now to FIG. 5A, a simulation system in operation 201 receives a model that represents a circuit design, such as an IC, that includes one or more victim cells; typically, an IC will include many victim cells (such as cells selected by a designer for analysis as victim cells or potentially all possible victim cells). The methods shown in FIGS. 5A and 5B can be performed for each victim cell. The model can include timing window information and transition slew information from a static timing analysis tool; this timing window information can include data about the timing window of the possible output transitions for each victim cell and this timing window information also includes data about the timing windows of the set of aggressors for each victim cell. In operation 203 the power analysis tool can use the timing window information to determine the set of aggressor cells for each victim cell based on an overlap of the timing windows; this overlap may be either a complete overlap or a substantial overlap (e.g., the overlap is at least 70% of the victim's timing window). For example, the power analysis tool in the example of FIG. 4 has determined that two aggressor cells have timing windows that overlap with the timing window of the victim cell. For the possible aggressor cells that do not have timing windows which substantially overlap with the timing window of the victim cell, these possible aggressor cells can be ignored in the methods shown in FIGS. 5A and 5B. Operation 203 can narrow the set of possible aggressors for a given victim using timing windows, and then the method can further narrow the set of possible aggressors based on overlaps in time between the victim's switching window (e.g., width 127 in FIG. 4) and each aggressor's switching window. The power analysis tool can compute these switching windows and perform the overlap comparisons of the switching windows to produce a further reduction in the set of aggressors based on the overlap comparisons to yield a final set of aggressors. In one embodiment, the power analysis tool can find the most overlap between the victim's switching window and the switching windows of the aggressors within the victim's switching window. In other words, the power analysis tool can find the specific instances where the number of aggressors (having switching windows that overlap with the victim's switching window) is maximized (resulting in the worst possible voltage drop impact), and this identified set of aggressors (based on the specific instances) is used in the dynamic voltage drop analysis in operations 203 and 205. The specific instances may occur over a time frame that is shorter than the entire time of the victim's switching window.

In operation 205, the power analysis tool can compute the power supply noise, induced by each aggressor cell that has a switching window that overlaps the victim's switching window, in the victim cell. This computation can produce the areas (e.g., A 1 and A 2) shown in the voltage plots 124 and 128 in FIG. 4; in other words, operation 205 can compute the areas showing power supply noise caused by each aggressor cell for a victim cell. In one embodiment, the power analysis tool in operation 205 can compute the power supply noise for both voltage supply rails (e.g., both $V_{DD}$ and $V_{SS}$) for each victim cell. Then in operation 207, the power analysis tool can, for each victim cell, compute the normalized power supply noise for each aggressor cell (and add together all of the normalized power supply noises from all of the aggressor cells as shown in FIG. 4); in one embodiment, the combined and normalized power supply noise is separately computed for both voltage supply rails in operation 207. An example of the result of operation 207 is the combined rectangular representation 143 shown in FIG. 4. After operation 207, processing can proceed to operation 211 in FIG. 5B.

In operation 211, the timing analysis tool can receive the normalized supply noises as an input from the power analysis tool. For each victim cell, this can be the height and width of each combined rectangular representation, such as combined rectangular representation 143. In some embodiments, the timing analysis tool may already have the width (e.g., width 127 in FIG. 4) for each victim cell and thus needs only the height data (e.g., $H_1+H_2$) for each victim cell. The height data provides a single voltage drop value for each victim cell that the timing analysis tool can use to compute signal delay at the victim's output caused by this voltage drop. In operations 213 and 215, the timing analysis tool can determine whether the victim cell is a single stage cell or a multiple stage cell. FIG. 6A shows an example of a single stage cell, and FIG. 6B shows examples of multiple stage cells (an AND gate 302 and a buffer 303 that contains a series of two inverters that share the same $V_{SS}$ and $V_{DD}$ voltage supply rails); a single stage cell uses predominately only one power supply voltage rail when switching (e.g., the CMOS inverter in FIG. 6A uses only $V_{DD}$ when its output switches to $V_{DD}$ and uses only $V_{SS}$ when its output switches to $V_{SS}$). A multiple stage cell uses both voltage supply rails when it switches and is thus susceptible to supply noise from both voltage supply rails. Also, the timing analysis tool can determine, in operation 213, the switching direction of the victim cell (e.g., either a rising transition as shown in voltage plot 126 in FIG. 4 or a falling transition from $V_{DD}$ to $V_{SS}$).

If operation 215 determines the victim is a single stage cell, then the timing analysis tool performs operation 219. In operation 219, the timing analysis tool performs a timing analysis for each single stage victim cell using only $V_{DD}$ noise when the output of the victim cell is rising to $V_{DD}$ and performs a timing analysis for other single stage victim cells that use only $V_{SS}$ noise when the output of those other single stage victim cells is falling to $V_{SS}$. Each such timing analysis can produce timing information for each single stage victim cell that shows a signal delay caused by supply noise created by the aggressors of each single stage victim cell. If operation 215 determines the victim is a multiple stage cell, then the timing analysis tool performs operation 217. In operation 217, the timing analysis tool performs a timing analysis for each multiple stage victim cell using both supply noises (for both voltage supply rails). Each such timing analysis in operation 217 can produce timing information for each multiple stage victim cell that shows a signal delay caused by both supply noises created by the aggressors of each multiple stage victim cell.

Figure 7:
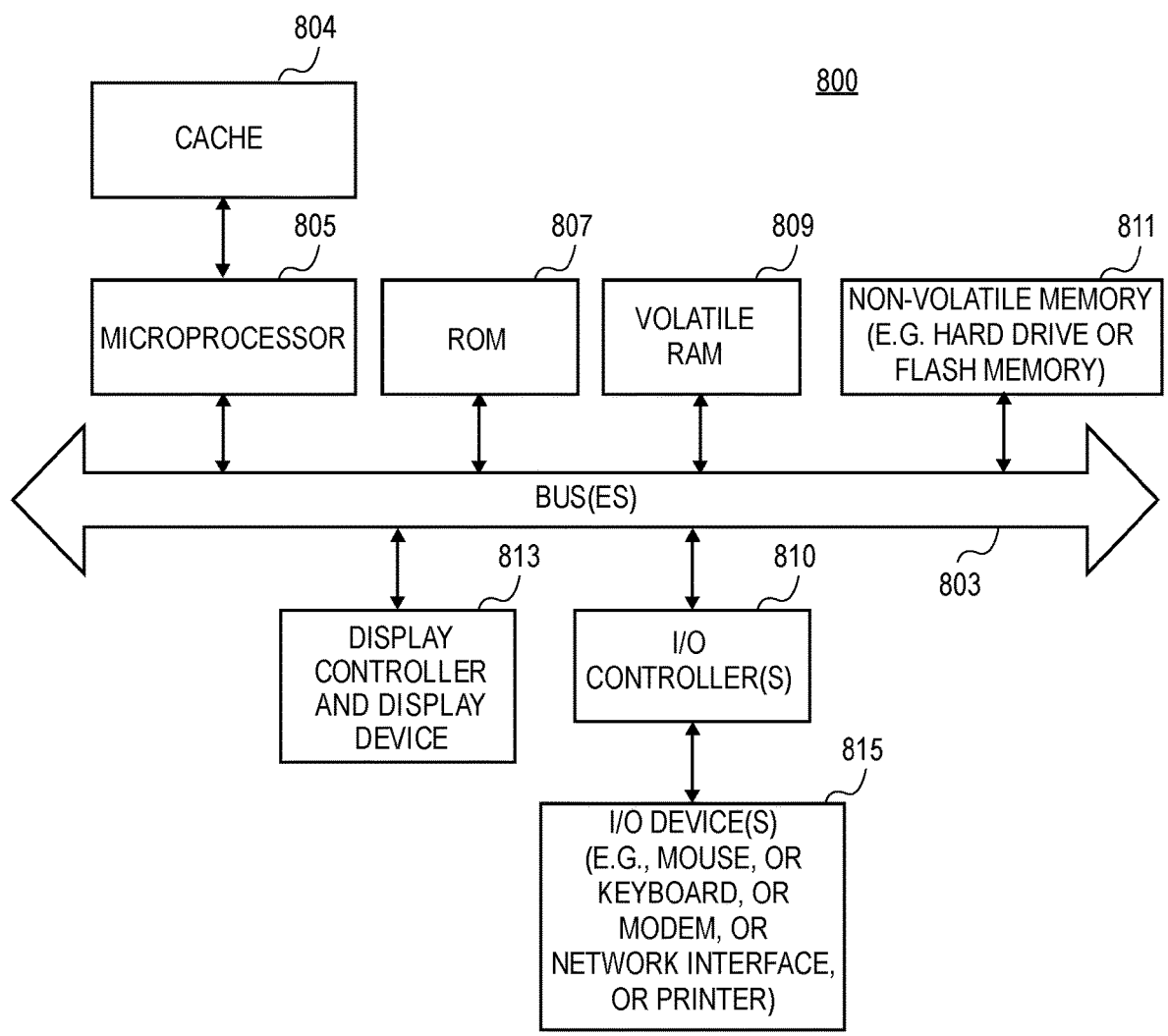
FIG. 7 shows an example of a data processing system that can perform one or more of the methods described herein and also be used to implement a system that can perform one or more embodiments described herein.

FIG. 7 shows one example of a data processing system 800, which may be used with one embodiment. For example, the system 800 may be implemented to provide a system or device that performs any one of the methods described herein. Note that while FIG. 7 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 7, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 7 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMS, EPROMS, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine-readable medium storing executable instructions which when executed by a data processing system cause the data processing system to perform a method comprising:
determining a switching window at an output of a victim cell in a design of a circuit, wherein a signal at the output switches during the switching window;
determining an energy loss at one or more power supply rails of the victim cell during the switching window due to aggressors in the design, wherein the energy loss for the victim cell is represented according to a geometric shape associated with a simulated voltage curve for the victim cell; and
computing a timing analysis at the output of the victim cell based on a representation of the energy loss for the victim cell.

2. The non-transitory machine-readable medium as in claim 1, wherein each switching window is a period of time in which a signal, at each output of each victim cell in a set of victim cells, switches.

3. The non-transitory machine-readable medium as in claim 2, wherein the geometric shape represents an area associated with the simulated voltage curve for the victim cell, and wherein the timing analysis is performed on a per victim cell basis separately based on the energy loss for that victim cell.

4. The non-transitory machine-readable medium as in claim 3, wherein the geometric shape for each victim cell is a rectangle having a width defined by a beginning and an ending of the switching window for each victim cell and a height computed from the area for that victim cell divided by the width for that victim cell.

5. The non-transitory machine-readable medium as in claim 3 wherein the area, for each victim cell, is the area between an ideal voltage supply rail and a simulated voltage supply after accounting for voltage drops at a voltage supply rail due to switching of aggressors in a vicinity of the corresponding victim cell, and wherein the area, for each victim, is computed by an integration of the space between a curve of the simulated voltage supply and the ideal voltage supply rail.

6. The non-transitory machine-readable medium as in claim 4, wherein a height and a width of the area for each victim cell is provided prior to computing the timing analysis.

7. The non-transitory machine-readable medium as in claim 2, wherein the timing analysis is computed for a first set of victim cells using only one voltage supply rail and for a second set of victim cells using two voltage supply rails, and wherein the switching window at the output of a victim cell occurs when the output of the victim cell transitions between voltage states.

8. The non-transitory machine-readable medium as in claim 7, for the first set of victim cells, only a first voltage supply rail is used when an output transition of a victim cell in the first set is falling and only a second voltage supply rail is used when an output transition of the victim cell in the first set is rising, the second voltage supply rail being at a higher voltage than the first voltage supply rail; and wherein each victim cell in the first set of victim cells is a single stage cell, and each victim cell in the second set of victim cells is a multiple stage cell.

9. The non-transitory machine-readable medium as in claim 6, wherein a power analysis tool performs the determining of the representation and provides the representation of the energy loss separately for each victim cell.

10. The non-transitory machine-readable medium as in claim 4, wherein the area for each victim cell is computed from the sum of areas contributed by each aggressor for a particular victim cell and wherein a center of the switching window is aligned to a center of the transition slew of the particular victim cell.

11. A machine-implemented method comprising:
determining a switching window at an output of a victim cell in a design of a circuit, wherein a signal at the output switches during the switching window;
determining an energy loss at one or more power supply rails of the victim cell during the switching window due to aggressors in the design, wherein the energy loss for the victim cell is represented according to a geometric shape associated with a simulated voltage curve for the victim cell; and
computing a timing analysis at the output of the victim cell based on a representation of the energy loss for the victim cell.

12. The method as in claim 11, wherein each switching window is a period of time in which a signal, at each output of each victim cell in a set of victim cells, switches.

13. The method as in claim 12, wherein the geometric shape represents an area associated with the simulated voltage curve for the victim cell, and wherein the timing analysis is performed on a per victim cell basis separately based on the energy loss for that victim cell.

14. The method as in claim 13, wherein the geometric shape for each victim cell is a rectangle having a width defined by a beginning and an ending of the switching window for each victim cell and a height computed from the area for that victim cell divided by the width for that victim cell.

15. The method as in claim 13, wherein the area, for each victim cell, is the area between an ideal voltage supply rail and a simulated voltage supply after accounting for voltage drops at a voltage supply rail due to switching of aggressors in a vicinity of the corresponding victim cell, and wherein the area, for each victim, is computed by an integration of the space between a curve of the simulated voltage supply and the ideal voltage supply rail.

16. The method as in claim 14, wherein a height and a width of the area for each victim cell is provided prior to computing the timing analysis.

17. The method as in claim 12, wherein the timing analysis is computed for a first set of victim cells using only one voltage supply rail and for a second set of victim cells using two voltage supply rails, and wherein the switching window at the output of a victim cell occurs when the output of the victim cell transitions between voltage states.

18. The method as in claim 17, for the first set of victim cells, only a first voltage supply rail is used when an output transition of a victim cell in the first set is falling and only a second voltage supply rail is used when an output transition of the victim cell in the first set is rising, the second voltage supply rail being at a higher voltage than the first voltage supply rail; and wherein each victim cell in the first set of victim cells is a single stage cell, and each victim cell in the second set of victim cells is a multiple stage cell.

19. The method as in claim 16, wherein a power analysis tool performs the determining of the representation and provides the representation of the energy loss separately for each victim cell.

20. The method as in claim 14, wherein the area for each victim cell is computed from the sum of areas contributed by each aggressor for a particular victim cell and wherein a center of the switching window is aligned to a center of the transition slew of the particular victim cell.

* * * * *